US010372715B1

(12) United States Patent
James et al.

(10) Patent No.: US 10,372,715 B1
(45) Date of Patent: Aug. 6, 2019

(54) MULTIPLE ENTITY MERGE FOR RANKING OBJECTS IN A SOCIAL NETWORK

(71) Applicant: Google Inc., Mountain View, CA (US)

(72) Inventors: Gavin James, Los Angeles, CA (US); Justin Lewis, Marina del Rey, CA (US)

(73) Assignee: Google LLC, Mountain View, CA (US)

( * ) Notice: Subject to any disclaimer, the term of this patent is extended or adjusted under 35 U.S.C. 154(b) by 616 days.

(21) Appl. No.: 13/856,200

(22) Filed: Apr. 3, 2013

(51) Int. Cl.
*G06F 16/00* (2019.01)
*G06F 16/2457* (2019.01)

(52) U.S. Cl.
CPC .............. *G06F 16/24578* (2019.01)

(58) Field of Classification Search
CPC ............ G06F 17/3053; G06F 16/24578
USPC .................................. 707/748, 749
See application file for complete search history.

(56) References Cited

U.S. PATENT DOCUMENTS

| | | | | |
|---|---|---|---|---|
| 2010/0049534 A1* | 2/2010 | Whitnah | ............... | G06Q 30/02 705/319 |
| 2012/0072493 A1* | 3/2012 | Muriello | ............... | G06Q 50/01 709/204 |
| 2013/0073568 A1* | 3/2013 | Federov | ............ | G06F 17/30867 707/749 |
| 2013/0246521 A1* | 9/2013 | Schacht | ................. | G06Q 50/01 709/204 |
| 2013/0346404 A1* | 12/2013 | Bennett | ............... | G06F 16/9535 707/732 |

OTHER PUBLICATIONS

Microsoft Research, "TrueSkill Ranking System", 2 pages, retrieved on Mar. 20, 2013 from http://research.microsoft.com/en-us/projects/trueskill/.
Manna, Joseph, "Breaking Down Facebook's Ranking Algorithm", 5 pages, Jan. 9, 2013, http://bigideasblog.infusionsoft.com/lead-generation-techniques-facebook/.
Wikipedia, "Arithmetic mean", 4 pages, retrieved on Mar. 20, 2013 from http://en.wikipedia.org/wiki/Arithmetic_mean.
Wikipedia, "Geometric mean", 8 pages, retrieved on Mar. 20, 2013 from http://en.wikipedia.org/wiki/Geometric_mean.

* cited by examiner

*Primary Examiner* — Chelcie L Daye
(74) *Attorney, Agent, or Firm* — Lowenstein Sandler LLP

(57) ABSTRACT

A method for multiple entity merge in a content sharing platform is disclosed. The method includes identifying two or more entities associated with an object of a social network. The method further includes, for each of the identified two or more entities, determining an affinity score between the entity and a user to which the object is presented on the social network. The method also includes applying a function to the determined affinity scores to generate a combined affinity score for the object.

20 Claims, 5 Drawing Sheets

400

```
┌─────────────────────────────────────────────────────────────────────┐
│ Receive object generated by a primary social network platform for   │
│ display in activity feed of a user                                  │
│                                                              410    │
└─────────────────────────────────────────────────────────────────────┘
                                  │
                                  ▼
┌─────────────────────────────────────────────────────────────────────┐
│ Identify entities associated with the received object, wherein at   │
│ least one of the entities is associated with the user via one or    │
│ more secondary social network platforms external to the primary     │
│ social network platform                                             │
│                                                              420    │
└─────────────────────────────────────────────────────────────────────┘
                                  │
                                  ▼
┌─────────────────────────────────────────────────────────────────────┐
│ For each entity that the user is connected to on the primary social │
│ network platform, calculate affinity score between the entity and   │
│ the user using affinity score data from the primary social network  │
│ platform                                                            │
│                                                              430    │
└─────────────────────────────────────────────────────────────────────┘
                                  │
                                  ▼
┌─────────────────────────────────────────────────────────────────────┐
│ For each entity that the user is connected to on the one or more    │
│ secondary social network platforms, calculate affinity score        │
│ between the entity and the user using affinity score data from the  │
│ secondary social network platforms                                  │
│                                                              440    │
└─────────────────────────────────────────────────────────────────────┘
                                  │
                                  ▼
┌─────────────────────────────────────────────────────────────────────┐
│ Apply function to calculated affinity scores to generate a merged   │
│ affinity score for the object                                       │
│                                                              450    │
└─────────────────────────────────────────────────────────────────────┘
                                  │
                                  ▼
┌─────────────────────────────────────────────────────────────────────┐
│ Pass affinity score for the object to a ranking module to rank the  │
│ object for purposes of display in the activity feed of the user at  │
│ the primary social network platform                                 │
│                                                              460    │
└─────────────────────────────────────────────────────────────────────┘
```

FIG. 4

MULTIPLE ENTITY MERGE FOR RANKING OBJECTS IN A SOCIAL NETWORK

TECHNICAL FIELD

This disclosure relates to the field of multimedia content and, in particular, to a multiple entity merge for ranking objects in a social network.

BACKGROUND

On the Internet, social networks allow users to connect to and share information with each other. Many social networks include a content sharing aspect that allow users to upload, view, and share content, such as video content, image content, audio content, and so on. Other users of the social network may comment on the shared content, discover new content, locate updates, share content, and otherwise interact with the provided content. The shared content may include content from professional content creators, e.g., movie clips, TV clips, and music videos, as well as content from amateur content creators, e.g., video blogging and short original videos.

A social network with content sharing capabilities may provide centralized locations for a content owner to showcase their content. These centralized locations are sometimes known as a channel, which is the representation of a user of the social network. The channel may be presented by the content sharing platform via one or more channel pages. The channel may be used by a content owner to convince new viewers to subscribe to the channel. Furthermore, a channel may be used by a content owner as a central location for subscribed viewers to comment on content, find the latest updates, and discover new content from the channel owner.

Currently, a social network may present to a user a listing (e.g., activity feed, feed, stream, wall, etc.) of objects (such as posts, content items (e.g., video, images, audio, etc.), status updates, favorability indications, tags, messages, and so on) generated by other users of the social network. The social network may rank these objects in the listing based on, for example, a determined relevance to the user. Various ranking algorithms may be utilized to generate this ranking of objects. One input to the ranking algorithm may be an affinity (e.g., frequency of contacts, variety of contacts, number of shared connections, etc.) between the viewing user and a user associated with the viewed object. Currently, the user that owns a viewed object (e.g, creates and posts the object) is determined for purposes of generating an affinity score between the viewing user and the viewed object.

However, due to the evolving nature of social networks, objects may be associated with more than one user. For example, a user of a social network may re-post an object posted by another user, resulting in both an original posting user of the object and the user that re-posted the object being associated with the object of the listing. Another example includes a user that posts an object and the multiple users that comment on that same object. In a further example, two or more social networks may merge together, resulting in multiple entities of the same user associated with an object. Current social network ranking algorithms do not reflect these multiple entities associated with an object when considering affinity with the viewing user for purposes of ranking the object.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a method for multiple entity merge for ranking objects in a social network is disclosed. The method includes identifying two or more entities associated with an object of a social network. The method further includes, for each of the identified two or more entities, determining an affinity score between the entity and a user to which the object is presented on the social network. The method also includes applying a function to the determined affinity scores to generate a combined affinity score for the object.

In one implementation, the object comprises at least one of a video, an image, a post, a favorable indication, a comment, a message, a tag, a subscription, or a status update. In other implementations, the affinity score is based on a number of connections made between the user and the entity using at least one of the social connection network, electronic mail communications, telephone communications, SMS communications, and MMS communications. In addition, the affinity score may further be based on a frequency of the number of connections made between the user and the entity.

Furthermore, in one implementation, the function comprises at least one of an average of the determined affinity scores, a weighted average of the determined affinity scores, an arithmetic mean of the determined affinity scores, or a geometric mean of the determined affinity scores. In another implementation, at least one of the two or more entities originates from another social network that is external to the social network.

In addition, the user may also be a member of the another social network, and wherein the user connects to the at least one of the two or more entities via the another social network. In one implementation, the method further comprises utilizing the combined affinity score to rank the object in a list of objects displayed to the user, where the objects originate from the social network or from the another social network that is external to the social network. In another implementation, the social network is a content sharing platform comprising one or more channels of the user.

In additional implementations, computing devices for performing the operations of the above described implementations are also disclosed. Additionally, in implementations of the disclosure, a computer readable storage media stores methods for performing the operations of the above described implementations.

BRIEF DESCRIPTION OF THE DRAWINGS

The present disclosure is illustrated by way of example, and not by way of limitation, in the figures of the accompanying drawings.

FIG. 4 is a flow diagram illustrating a method for multiple entity merge for ranking an object in a social network that is merged with one or more other social networks, according to an implementation of the disclosure.

DETAILED DESCRIPTION

Implementations are described for multiple entity merge for ranking objects in a social network. In one implementation, objects, such as feed items in an activity feed of a user of a social network, are ranked within the activity feed based on a combined affinity score representing all entities associated with the object. The entities associated with the object may include a user that originated the object and users that shared or otherwise interacted with the object. In addition, multiple entities of a single user from multiple social networks that are merged together may be represented in the combined affinity score.

In one implementation, a method of the disclosure includes identifying two or more entities associated with an object of a social network. The method further includes, for each of the identified two or more entities, determining an affinity score between the entity and a user to which the object is presented on the social network. The method also includes applying a function to the determined affinity scores to generate a combined affinity score for the object.

Implementations of the disclosure have a different layer of granularity than previous solutions for ranking objects based on an affinity score in a social network. Previously, only one entity was considered when calculating an affinity score for an object in a social network. This resulted in a less than accurate representation of an affinity score for an object that had multiple users associated with the object. Implementations of the disclosure overcome this shortcoming by determining each entity associated with an object and generating a combined affinity score to represent these determined entities.

Figure 1:
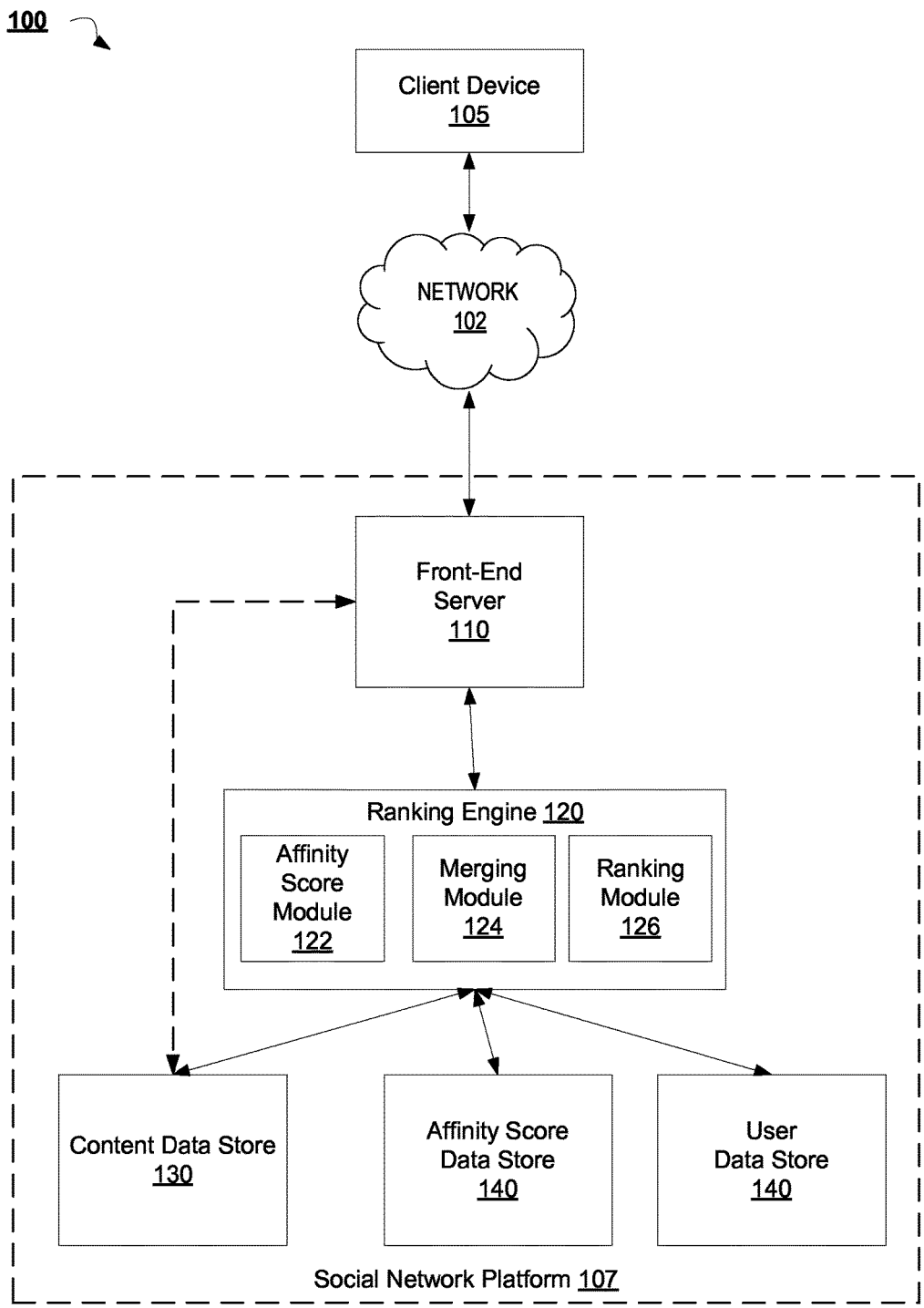
FIG. 1 is a block diagram illustrating an exemplary network architecture in which implementations of the disclosure may be used.

FIG. 1 is a block diagram illustrating an exemplary network architecture 100 in which implementations of the disclosure may be used. The network architecture 100 includes a client device 105 communicably coupled to a social network platform 107 via a network 102. In some implementations, social network platform 107 is also known as a content sharing platform. The network 102 includes the Internet in one implementation. In other implementations, other networks, wired and wireless, such as an intranet, local area network (LAN), wide area network (WAN), or broadcast network may be used as or be part of network 102.

Social network platform 107 allows users to connect to and share information with each other. Many social networks include a content sharing aspect that allow users to upload, view, tag, and share content, such as video content, image content, audio content, and so on. Other users of the social network may comment on the shared content, discover new content, locate updates, share content, and otherwise interact with the provided content. The shared content may include content from professional content creators, e.g., movie clips, TV clips, and music videos, as well as content from amateur content creators, e.g., video blogging and short original videos. In some implementations, the shared content is stored in content data store 130 of social network platform 107.

As illustrated, social network platform 107 includes front-end server 110, ranking engine 120, a content data store 130, an affinity score data store 140, and a user data store 150. A data store may include, but is not limited to, a table, a database, a directory, a repository, and one or more files, to name a few examples. One or more client devices 105 may be in communication with the front-end server 110 over the network 102.

The client device 105 may be any type of computing device, for example, a device including a processor, a computer-readable medium, and a memory. The client device 105 may be, for example, a personal computer, a laptop computer, a tablet computer, a personal digital assistant (PDA), a cellular telephone, other mobile devices, etc. In some implementations, the client device 105 may be executing a browser application or other application adapted to communicate over Internet related protocols (e.g., TCP/IP and HTTP) and/or display a user interface. While only a single client device 105 is shown in FIG. 1, network architecture 100 may support a large number of concurrent sessions with many client devices 105.

Social network platform 107 is capable of operating within a single server device or on multiple server devices. For example, although each of front-end server 110, ranking engine 120, content data store 130, affinity score data store, 140, and user data store 150 are depicted in FIG. 1 as single, disparate components, these components may be implemented together in a single device or networked in various combinations of multiple different devices that operate together. Examples of devices may include, but are not limited to, servers, mainframe computers, networked computers, process-based devices, and similar type of systems and devices.

During operation of network architecture 100, a user may access social network platform 107 via client device 105 over network 102. The front-end server 110 receives communications from the client device 105, and processes and/or directs these communications accordingly. In one implementation, the front-end server 110 comprises a processing device and a computer-readable memory.

Front-end server 110 is communicably coupled to ranking engine 120, which may reside on the same machine as front-end server 110 or a different machine. Ranking engine 120 may be implemented in hardware, software, firmware, or any combination of the above. In implementations of the disclosure, ranking engine 120 merges multiple entities for purposes of ranking objects of the social network platform 107. In one implementation, ranking engine 120 includes an affinity score module 122, merging module 124, and a ranking module 126.

In one implementation, social network platform 107 provides a centralized location for a user to showcase objects related to the user, such as information and content pertaining to the user. In one implementation, an object includes a post, a content item (e.g., audio, video, image), a comment, a message, an email message, a status update, a favorability indication (e.g., a like), a subscription event, a tagging event, a viewing event (e.g., click), and so on. The centralized location is sometimes known as a user page or a channel. In addition, in some implementation, the representation of the user on the social network platform 107 may be known as an "entity" of the user.

As discussed above, a channel can be data content available from a common source or data content having a common topic or theme. The data content can be digital content chosen by a user, digital content made available by a user, digital content uploaded by a user, digital content chosen by a content provider, digital content chosen by a broadcaster, etc. For purposes of the description below, the centralized location is referred to as a "user page", but implementations may be applied to other types of centralized locations of social networks.

Different activities can be associated with a user based on the user's actions, such as making digital content available on the user page, the user selecting (e.g., liking) an object associated with another user, the user commenting on an object associated with another user, etc. The activities associated with a user may be collected into an activity feed (which may also be known as a listing, stream, wall, or feed, to name a few examples) for the user. In one implementation, an activity feed includes a central location (e.g., document rendered as a web page for the social network platform 107) that displays one or more objects associated with other users of the social network platform 107 (or other external social network platforms) to which the user has connected (e.g., subscribed, liked, friended, etc.).

Once a user connects to an entity (e.g., another user) on the social network platform 107, an activity feed of the user may be displayed with information from the connected entity's activity feed. If a user subscribes to multiple entities, the activity feeds from the connected entities can be combined into a syndicated activity feed for the user. Information from the syndicated activity feed can be presented to the user in the user's activity feed.

In one implementation, ranking engine 120 ranks objects in the activity feed of a user based on, for example, a determined relevance to the user. Various ranking algorithms may be utilized by ranking module 126 to generate this ranking of objects. In one implementation, an input to the ranking algorithm used by ranking module 126 is an affinity score between the viewing user and a user associated with the viewed object.

In one implementation, an affinity score is an indication of a level of connection between two users of the social network platform 107. For example, an affinity score may be calculated by looking at explicit actions that users take (e.g., clicking, liking (providing a positive feedback), commenting, tagging (e.g., assigning an identifier to a piece of information), sharing, friending (requesting to be a friend), etc.), and factoring in the strength of the action, how "connected" the user who took the action was to the target user (e.g., how many mutual connections they share, etc.), and how long ago they took the action. In addition, other factors such as mode of communication, frequency of communications, and so on, may be taken into consideration for determining an affinity score. Note that an affinity score may be a one-way score (e.g., not reciprocal). In other words, a first user's affinity score for a second user is not necessarily the same as the second user's affinity score for the first user.

In one implementation, ranking engine 120 creates a combined affinity score for an object having two or more users (e.g., entities) associated with the object. As previously mentioned, an entity may include a user's representation on the social network platform 107. Affinity score module 122 and merging module 124 may generate and provide this combined affinity score.

In implementations of the disclosure, when ranking engine 120 receives an object to be ranked for a user, the ranking engine 120 first determines the entities (e.g., users) associated with the object. In one implementation, more than one entity may be associated with an object. For example, a user of the social network platform 107 may re-post an object posted by another user, resulting in both a first entity of an original posting user of the object and a second entity of the user that re-posted the object. Another example includes a user that posts an object and the multiple users that comment on that same object. In a further example, two or more social network platforms may merge together, resulting in multiple entities of the same user associated with an object (further discussion of this scenario is found below with respect to FIG. 2). Implementations of the disclosure encompass two or more entities being associated with an object.

After the users associated with an object are determined, affinity score module 122 may determine an affinity score between the viewing user (whose activity feed displays the object) and each determined entity/user associated with the object. In some implementations, the affinity score data store 140 is referenced to obtain affinity score data maintained for each user of the social network platform 107. For example, affinity score data store 140 may include a data structure having an entry for each user of the social network platform 107, where each entry details an affinity score to each of the other users that the user has connected. In addition, the user data store 150 may be referenced to determine the other users that the user has connected.

In some implementations, the affinity score data store 140 is updated in a periodic and ongoing basis based on actions (e.g., clicking, liking, commenting, tagging, sharing, friending, etc.) taken by the user on the social network platform 107. In some implementations, actions outside of the social network platform 107 (such as email communication, telephone communication, text message communication, etc.) may also be considered for purposes of determining an affinity score between users.

When affinity scores have been determined for each entity/user associated with the object, these affinity scores are passed to merging module 124 to generate a combined affinity score for the object. In some implementations, two or more affinity scores may be passed to merging module 124. As an example of merging affinity scores, consider a video (i.e., object) that is created by Alice and shared by Bob. The video is shared by Bob with Charlie, who is the viewing user. As a result, the object has two users associated with it: Alice (the content owner) and Bob (the content sharer). In terms of affinity scores, assume that Charlie has affinity 0.1 with Alice because he does not interact with Alice frequently. Further assume that Charlie has affinity 0.9 with Bob because they email each other frequently. These two affinity score of 0.1 and 0.9 may be merged by merging module 124 into a combined affinity score in implementations of the disclosure, as discussed further below.

Merging module 124 may utilize any of a variety of mathematical functions to merge affinity scores including, but not limited to, adding scores, taking a higher score, taking a lower score, averaging scores, weighted averaging of scores, multiplying scores, arithmetic mean of scores, geometric mean of score, inverted geometric mean of scores, mode of scores, and so on. In some implementations, the scale of the affinity scores may be interchangeable because they may be scaled (e.g. scores in 0 to 5 stars can simply be divided by 5 to get them into the range 0-1.) Furthermore, in other implementations, the affinity scores may be "skewed" to cause higher scores to stand out more and lower scores to be minimized. For example, for affinity scores on a range of 0 to 1, a square root of the affinity score may be taken to skew the score. This score skewing may be performed prior to the merging at the merging module 124 or after the merging at the merging module 124.

In one example, the geometric mean for two affinity scores is calculated by multiplying the two affinity scores together and then taking the square root. However, this has the effect of giving more weight to the lower affinity score. In addition, if any affinity score is zero, the geometric mean results in the combined affinity score being zero. Accordingly, an inverted geometric mean may be utilized where each of the affinity scores are subtracted from one to "flip them over", the geometric mean of the flipped-over affinity scores is calculated, and that result is "flipped over" again (subtracted from one). As a result, the inverted geometric mean provides a heavier weight to higher affinity scores of the group of affinity scores being combined.

After the affinity scores have been merged into a combined affinity score by merging module 124, the combined affinity score may be provided to ranking module 126 in order for ranking module 126 to rank the object for purposes of placement in the user's activity feed. Any variety of ranking algorithms may be implemented by ranking module 126 using the combined affinity score. In some implementations, the combined affinity score of an object may also be utilized for purposes other than object ranking, such as selecting a single feed item out of many feed items for display to a user of the social network platform 107, determining if and when a notification should be sent, discarding objects from an activity feed (e.g., if the object's combined affinity score does not exceed a threshold score), and/or contributing back into the ranking engine 120 in order to act as input to affinity scores of other scoring contributors, to name a few examples.

Figure 2:
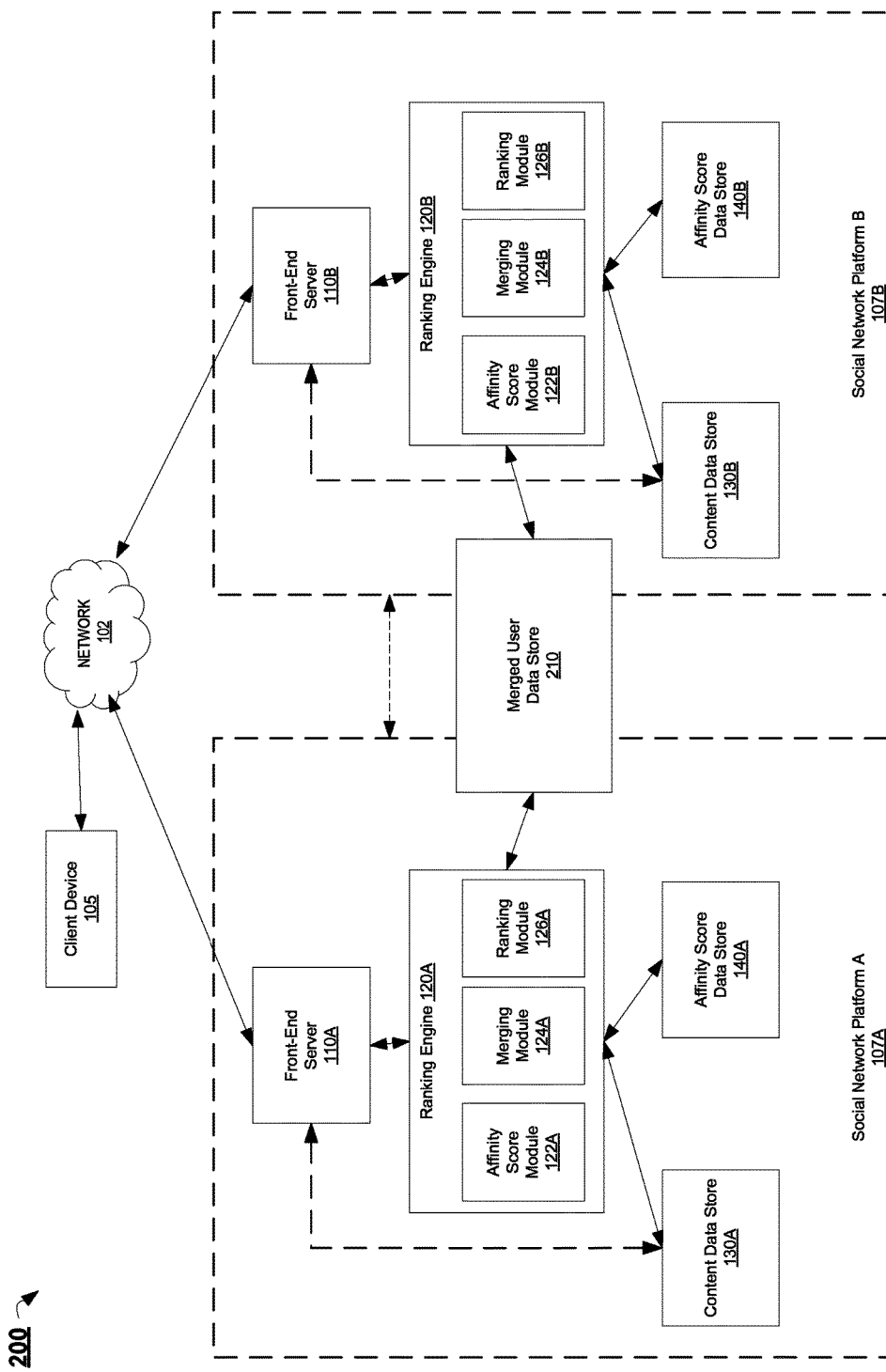
FIG. 2 is a block diagram illustrating another exemplary network architecture in which implementations of the disclosure may be used.

FIG. 2 is a block diagram illustrating another exemplary network architecture 200 in which implementations of the disclosure may be used. More specifically, network architecture 200 depicts multiple social network platforms 107A, 107B merged together and communicably coupled via network 102 to client device 105. In one implementation, network 102 and client device 105 are the same their counterparts from FIG. 1.

In some implementations, social network platforms 107A, 107B may be merged when consolidating the services of the platforms. When merging social network platforms, entities of each the platforms that have a same user are integrated together. Although two social network platforms 107A, 107B are shown as merged in FIG. 2, implementations of the disclosure may encompass merging of more than two social network platforms.

In implementations of the disclosure, each social network platform 107A, 107B may merge multiple entities to provide for object ranking in the social network platforms 107A, 107B. In one embodiment, social network platforms 107A, 107B, and their associated components, are the same as social network platform 107, and its associated components, described with respect to FIG. 1.

In one implementation, a user may create an entity to use with each social network platform 107A, 107B. When the social network platforms 107A, 107B are merged, the entities associated with the user are also merged. In one implementation, a merged user data store 210 is shared between the social network platforms 107A, 107B and used to associate entities of each social network platform 107A, 107B to users. In other implementations, although not specifically illustrated, additional components of social network platforms 107A, 107B may also be shared between the platforms 107A, 107B when they are merged. For example, any of the front end server 110A, 110B, ranking engine 120A, 120B, content data store 130A, 130B, or affinity score data store 140A, 140B may be merged and shared between the merged social network platforms 107A, 107B.

When social network platforms 107A, 107B are merged, an activity feed of a user may include objects associated with each of the entities of the user on each social network platform 107A, 107B. As such, objects in the user's activity feed may have multiple entities of the user associated with the object. Accordingly, implementations of the disclosure may utilize the merging module 124A, 124B of ranking engine 120A, 120B to generate a combined affinity score based on the multiple entities (and therefore multiple affinity scores) associated with an object.

For example, assume that Charlie is connected to (e.g., subscribed to) Alice on social network platform A 107A and that Charlie is connected to Bob on social network platform B 107B. Further assume that Bob shares a video made by Alice on social network platform A 107A. Because social network platform A and B 107A, 107B are merged, social network platform A 107A may generate an object representing Bob's action of sharing Alice's video to present to Charlie on social network platform A 107A, even though Charlie and Bob are not connected on social network platform A 107A. In addition, this object may be ranked by ranking engine 120A using a combined affinity score that merges the affinity score between Charlie and Alice from social network platform A 107A, and the affinity score between Charlie and Bob from social network platform B 107B. In some implementations, ranking engine 120A can communicate (directly, or indirectly via network 102) with social network platform B 107B to obtain the affinity score data between Charlie and Bob.

In one implementation, when more than one social network platform 107A, 107B are merged, each platform 107A, 107B may maintain, for each user, a list of entities connected to the user that receive a syndication of an object. Then, when the object is syndicated in the other merged platforms 107A, 107B, this list can be compared to the user's connected entities on the other merged platforms 107A, 107B to prevent repeat syndication to connected entities (e.g., when a user has mutual connected entities among disparate social network platforms 107A, 107B).

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 3:
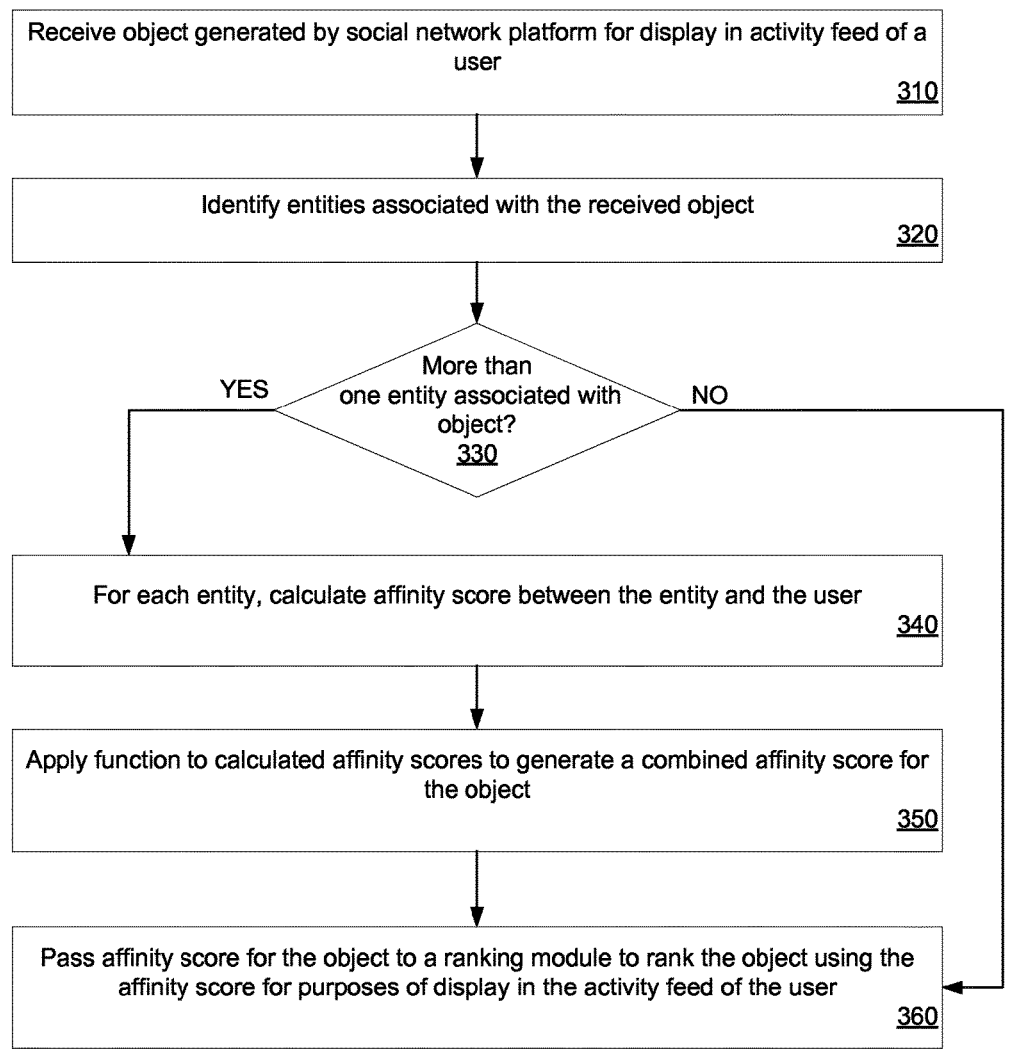
FIG. 3 is a flow diagram illustrating a method for merging multiple entities for ranking an object in a social network, according to some implementations of the disclosure.

FIG. 3 is a flow diagram illustrating a method 300 for merging multiple entities for ranking an object in a social network, according to some implementations of the disclosure. The method 300 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by ranking engine 120 of social network platform 107, as shown in FIG. 1.

Referring to FIG. 3, at block 310, method 300 begins when an object generated by a social network platform is received for display in an activity feed of a user of the social network platform. In one implementation, the object is associated with an action performed by and/or content provided by the user or by other users of the social network platform. For example, the object may comprise posting of a comment, posting of a content item, sharing another object, tagging an object, subscribing to a user, liking another object, updating a status, and so on.

Then, at block 320, one or more entities associated with the received object are identified. In one implementation, an entity is a user of the social network platform. Entities associated with an object may include a representation of user that originated the subject matter of the object and a representation of another user that shared or otherwise acted on the object (e.g., liked, commented, etc.). At decision block 330, it is determined whether there is more than one entity associated with the object. If not, method 300 proceeds to block 360, discussed further below.

If there is more than one entity associated with the object at decision block 330, the method 300 proceeds to block 340 where, for each entity, an affinity score between the entity and the user viewing the object is calculated. In one implementation, an affinity score is an indication of a level of connection between two users. For example, an affinity score may be calculated by looking at explicit actions that users take (e.g., clicking, liking, commenting, tagging, sharing, friending, etc.), and factoring in the strength of the action, how "connected" the user who took the action was to the target user (e.g., how many mutual connections they share, etc.), and how long ago they took the action. In addition, other factors such as mode of communication, frequency of communications, and so on, may be taken into consideration for determining an affinity score.

Subsequently, at block 350, a function is applied to the calculated affinity score to generate a combined affinity score for the object. In one implementation, the function includes any of a variety of mathematical functions to merge affinity scores such as, but not limited to, adding scores, taking higher score, averaging scores, weighted averaging of scores, multiplying scores, arithmetic mean of scores, geometric mean of score, inverted geometric mean of scores, mode of scores, and so on.

Then, at block 360, the affinity score for the object is passed to a ranking module to rank the object using the affinity score. In one implementation, the object ranking is performed for purposes of displaying the object in the activity feed of the user. If method 300 arrived at block 360 directly from decision block 330, then one entity is associated with the object, and, as such, the affinity score between the user and that entity is passed at block 360. If method 300 arrived at block 360 from block 350, then the combined affinity score is passed at block 360.

FIG. 4 is a flow diagram illustrating a method 400 for multiple entity merge for ranking an object in a social network that is merged with one or more other social networks, according to an implementation of the disclosure. The method 400 may be performed by processing logic that comprises hardware (e.g., circuitry, dedicated logic, programmable logic, microcode, etc.), software (e.g., instructions run on a processing device to perform hardware simulation), or a combination thereof. In one implementation, method 400 may be performed by ranking engine 120 of a social network platform 107, as shown in FIG. 1.

Referring to FIG. 4, at block 410, method 400 begins when an object generated by a primary social network platform is received for display in an activity feed of a user of the primary social network platform. In one implementation, the object is associated with an action performed by the user or by other users of the primary social network platform. For example, the object may comprise posting of a comment, posting of a content item, sharing another object, tagging an object, subscribing to a user, liking another object, updating a status, and so on.

Then, at block 420, one or more entities associated with the received object are identified, where at least one of the entities is associated with the user via a one or more secondary social network platform that is external to the primary social network platform receiving the object. Note that although the terms "primary" and "secondary" are utilized in the present description, these terms do not necessarily indicate a level of importance between the various social network platforms, and instead are utilized to merely distinguish between the various social network platforms.

Entities associated with an object may include a representation of a user that originated the subject matter of the object and a representation of another user that shared or otherwise acted on the object (e.g., liked, commented, etc.). In one implementation, an entity is a representation of a user of the primary social network platform or of the secondary social network platforms external to the primary social network platform. For example, an entity may include a user of any one of multiple social network platforms that are merged together. When multiple social network platforms are merged, a single user's various entities among the platforms are integrated or joined.

At block 430, for each other entity that the user is connected to on the primary social network platform, an affinity score between the entity and the user viewing the object is calculated using affinity score data from the primary social network platform. In one implementation, an affinity score is an indication of a level of connection between two users. For example, an affinity score may be calculated by looking at explicit actions that users take (e.g., clicking, liking, commenting, tagging, sharing, friending, etc.), and factoring in the strength of the action, how "connected" the user who took the action was to the target user (e.g., how many mutual connections they share, etc.), and how long ago they took the action. In addition, other factors such as mode of communication, frequency of communications, and so on, may be taken into consideration for determining an affinity score.

Subsequently, at block 440, for each entity that the user is connected to on the one or more secondary social network platforms, an affinity score between the entity and the user viewing the object is calculated using affinity score data from the secondary social network platform.

At block 450, a function is applied to the calculated affinity score to generate a combined affinity score for the object. In one implementation, the function includes any of a variety of mathematical functions to merge affinity scores such as, but not limited to, adding scores, taking higher score, averaging scores, weighted averaging of scores, multiplying scores, arithmetic mean of scores, geometric mean of score, inverted geometric mean of scores, mode of scores, and so on. Then, at block 460, the affinity score for the object is passed to a ranking module to rank the object for purposes of displaying it in the activity feed of the user.

Figure 5:
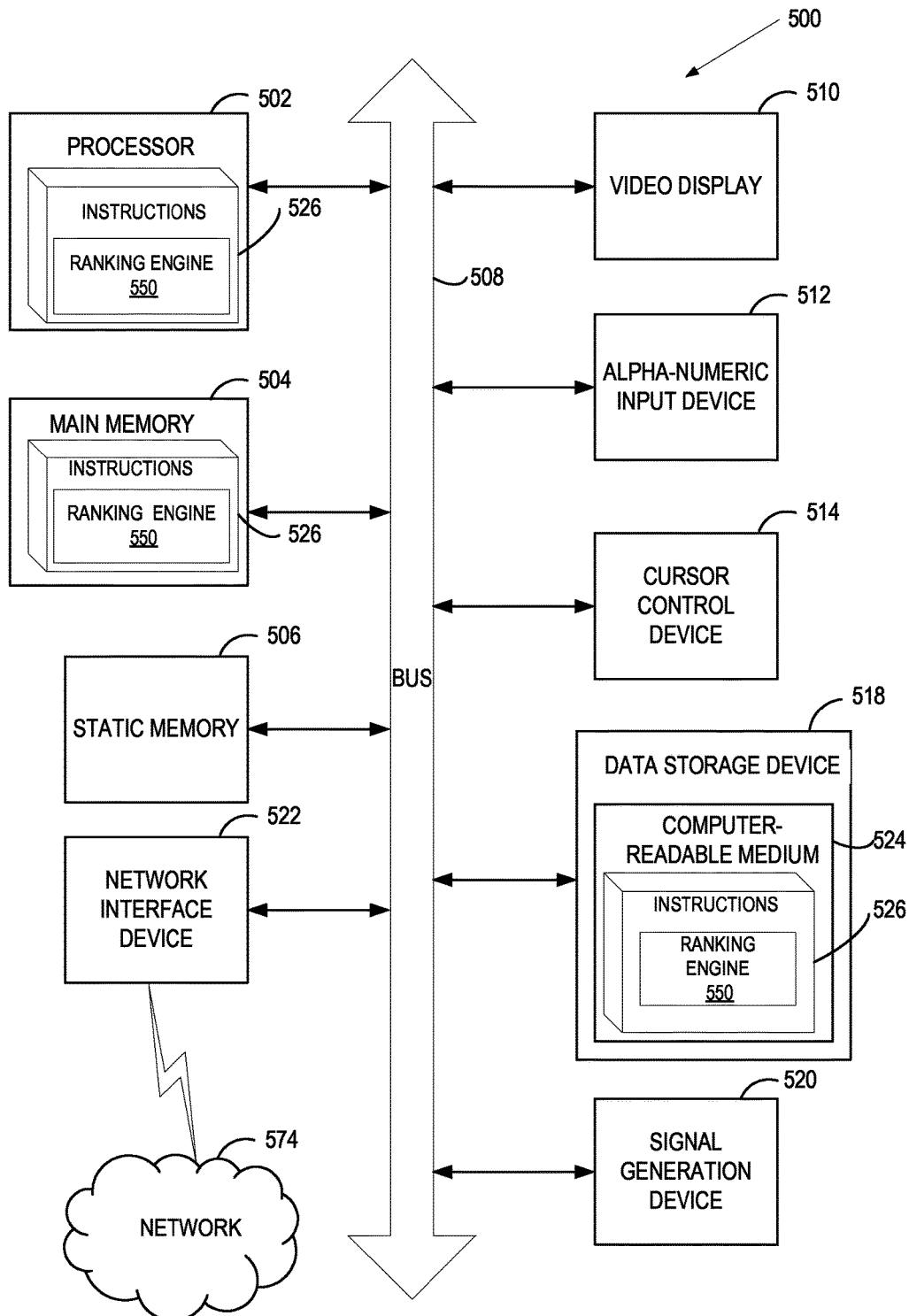
FIG. 5 is a block diagram illustrating an exemplary computer system, according to some implementations.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD), a cathode ray tube (CRT), or a touch screen), an alphanumeric input device 512 (e.g., a keyboard), a cursor control device 514 (e.g., a mouse), and a signal generation device 520 (e.g., a speaker).

The data storage device 518 may include a computer-readable storage medium 524 on which is stored one or more sets of instructions 526 (e.g., software) embodying any one or more of the methodologies or functions described herein. The instructions 526 may also reside, completely or at least partially, within the main memory 504 and/or within the processor 502 during execution thereof by the computer system 500, the main memory 504 and the processor 502 also constituting computer-readable storage media. The instructions 526 may further be transmitted or received over a network 574 via the network interface device 522.

In one embodiment, the instructions 526 include instructions for a ranking engine 550, which may correspond to ranking engine 120 of FIG. 1, and/or a software library containing methods that call a ranking engine for merging multiple entities to rank an object in a social network. While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive or.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   identifying, by a processing device, an object of a social network; and
   ranking the object for displaying the object to a first user on the social network, wherein the ranking comprises:
      identifying two or more entities associated with the object, wherein the two or more entities comprise at least a second user that publishes the object and a third user that shares the object, and wherein at least one of the identified two or more entities is associated with another social network that is external to the social network and is a representation of the first user on the another social network;
      for the two or more entities, determining respective user affinity scores between the first user and a corresponding entity, wherein the respective user affinity scores indicate a level of connection between the first user and the corresponding entity and are based on communications made between the first user and the corresponding entity via first communication channels that are internal to the social network and via second communication channels that are external to the social network;
      generating an object affinity score for the object by combining, via a function, the user affinity scores between the first user and each of the identified two or more entities; and
      utilizing the object affinity score to rank the object for display of the object to the first user.

2. The method of claim 1, wherein the object comprises at least one of a video, an image, a post, a favorable indication, a comment, a message, a tag, a subscription, or a status update.

3. The method of claim 1, wherein the user affinity scores are in view of a number of the communications made between the first user and the corresponding entity using at least one of the social network, electronic mail communications, telephone communications, SMS communications, or MMS communications.

4. The method of claim 3, wherein the user affinity scores are further in view of a frequency of the number of the communications made between the first user and the corresponding entity.

5. The method of claim 1, wherein the function comprises at least one of an average of the determined user affinity scores, a weighted average of the determined user affinity scores, an arithmetic mean of the determined user affinity scores, or a geometric mean of the determined user affinity scores.

6. The method of claim 1, wherein the first user is also a member of the another social network, and wherein the first user connects to the at least one of the identified two or more entities via the another social network.

7. The method of claim 1, wherein the object originates from the social network or from the another social network that is external to the social network.

8. The method of claim 1, wherein the social network is a content sharing platform comprising one or more channels corresponding to the first user.

9. A non-transitory machine-readable storage medium storing instructions which, when executed, cause a processing device to perform operations comprising:
   receiving, by the processing device, an object for display in an activity feed of a first user of a social network; and
   ranking the object for displaying the object to the first user on the social network, wherein the ranking comprises:
      identifying two or more entities associated with the object, wherein the two or more entities comprise at least a second user that publishes the object and a third user that shares the object, and wherein at least one of the identified two or more entities is associated with another social network that is external to the social network and is a representation of the first user on the another social network;
      for the two or more entities, determining respective user affinity scores between the first user and a corresponding entity, wherein the respective user affinity scores indicate a level of connection between the first user and the corresponding entity and are based on communications made between the first user and the corresponding entity via first communication channels that are internal to the social network and via second communication channels that are external to the social network;
      generating an object affinity score for the object by combining, via a function, the user affinity scores between the first user and each of the identified two or more entities; and utilizing the object affinity score to rank the object for display of the object to the first user.

10. The non-transitory machine-readable storage medium of claim 9, wherein the object comprises at least one of a video, an image, a post, a favorable indication, a comment, a message, a tag, a subscription, or a status update.

11. The non-transitory machine-readable storage medium of claim 9, wherein the user affinity scores are in view of a number of the communications made between the first user and the corresponding entity using at least one of the social network, electronic mail communications, telephone communications, SMS communications, or MMS communications, and wherein the user affinity scores are further based on a frequency of the number of the communications made between the first user and the corresponding entity.

12. The non-transitory machine-readable storage medium of claim 9, wherein the function comprises at least one of an average of the determined user affinity scores, a weighted average of the determined user affinity scores, an arithmetic mean of the determined user affinity scores, or a geometric mean of the determined user affinity scores.

13. The non-transitory machine-readable storage medium of claim 9, wherein the object originates from the social network or from the another social network that is external to the social network.

14. A system comprising:
a processing device;
a memory coupled to the processing device, the memory to store a plurality of content items; and
a ranking engine executable by the processing device from the memory, the ranking engine to:
identify an object of a social network; and
rank the object for displaying the object to a first user on the social network, wherein the ranking comprises:
identify two or more entities associated with the object, wherein the two or more entities comprise at least a second user that publishes the object and a third user that shares the object, and wherein at least one of the identified two or more entities is associated with another social network that is external to the social network and is a representation of the first user on the another social network;
for the two or more entities, determine respective user affinity scores between the first user and a corresponding entity, wherein the respective user affinity scores indicate a level of connection between the first user and the corresponding entity and are based on communications made between the first user and the corresponding entity via first communication channels that are internal to the social network and via second communication channels that are external to the social network;
generate an object affinity score for the object by combining, via a function, the affinity scores between the first user and each of the identified two or more entities; and
utilize the object affinity score to rank the object for display of the object to the first user.

15. The system of claim 14, wherein the object comprises at least one of a video, an image, a post, a favorable indication, a comment, a message, a tag, a subscription, or a status update.

16. The system of claim 14, wherein the user affinity scores are in view of a number of the communications made between the first user and the corresponding entity using at least one of the social network, electronic mail communications, telephone communications, SMS communications, or MMS communications, and wherein the user affinity scores are further in view of a frequency of the number of the communications made between the first user and the corresponding entity.

17. The system of claim 14, wherein the function comprises at least one of an average of the determined user affinity scores, a weighted average of the determined user affinity scores, an arithmetic mean of the determined user affinity scores, or a geometric mean of the determined user affinity scores.

18. The system of claim 14, wherein the first user is also a member of the another social network, and wherein the first user connects to the at least one of the identified two or more entities via the another social network.

19. The non-transitory machine-readable storage medium of claim 9, wherein the social network is a content sharing platform comprising one or more channels corresponding to the first user.

20. The system of claim 14, wherein the social network is a content sharing platform comprising one or more channels corresponding to the first user.

* * * * *